United States Patent [19]

Clark

[11] 3,968,694
[45] July 13, 1976

[54] GAUGE FOR REMOTELY INDICATING THE PRESSURE OF A SUBTERRANEAN FORMATION

[75] Inventor: Kenneth K. Clark, Tulsa, Okla.

[73] Assignee: Geophysical Research Corporation, Tulsa, Okla.

[22] Filed: Apr. 21, 1975

[21] Appl. No.: 569,945

[52] U.S. Cl. .............................. 73/398 C; 73/406; 317/246
[51] Int. Cl.² ..................... G01L 9/12; G01L 7/08; H01G 7/00
[58] Field of Search .................. 73/389, 398 C, 406; 317/246

[56] References Cited
UNITED STATES PATENTS

| | | |
|---|---|---|
| 2,367,866 | 1/1945 | Humphreys et al. .......... 73/398 C X |
| 2,439,047 | 4/1948 | Grinstead et al. ............ 73/398 C X |
| 2,896,138 | 7/1959 | Grinstead .................... 73/398 C X |
| 3,557,621 | 1/1971 | Ferran ........................ 73/398 C |
| 3,595,084 | 7/1971 | Bailey et al. ................ 73/398 C |
| 3,619,742 | 11/1971 | Rud, Jr. ..................... 73/398 C X |
| 3,742,347 | 6/1973 | Walton ....................... 73/398 C X |
| 3,858,097 | 12/1974 | Polye ......................... 73/398 C X |

Primary Examiner—Richard C. Queisser
Assistant Examiner—John S. Appleman
Attorney, Agent, or Firm—Head, Johnson & Chafin

[57] ABSTRACT

A gauge for remotely indicating the pressure in a subterranean formation penetrated by a bore hole, including a tubular closed housing, the lower end of the closed housing forming an integral diaphragm which is subjected to the pressure of the subterranean formation, the housing having an internal reduced diameter portion adjacent the diaphragm forming an integral circumferential ledge, a cup shaped stator element having a closed bottom and opened top, the external diameter of the stator element being slightly less than the internal diameter of the housing and having an enlarged external diameter lip which engages the internal ledge of the tubular housing to precisely position the stator element relative to the diaphragm, the stator element having a conductive surface on the lower end thereof spaced adjacent to the diaphragm forming therebetween a capacitive relationship responsive to pressure deflection of the diaphragm, means of connecting the end of the housing opposite the diaphragm to a conductive cable extending to the earth's surface by which the gauge is lowered in and raised from the bore hole and by means of which electrical signals are passed to the earth's surface and an oscillator circuit within the housing connecting with the capacitive elements formed by the diaphragm and stator to provide an A.C. signal indicative of the pressure detected by the gauge.

8 Claims, 5 Drawing Figures

GAUGE FOR REMOTELY INDICATING THE PRESSURE OF A SUBTERRANEAN FORMATION

BACKGROUND, SUMMARY AND OBJECTS OF THE INVENTION

In petroleum exploration it is important to know accurately the pressure of oil and gas bearing formations penetrated by bore holes. For this purpose, there has been available for many years various types of bottom hole pressure gauges. Some pressure gauges include recording means within the gauge itself. The gauge is lowered into the hole at the end of a wire line. After the pressure recording is made, the gauge is retrieved and a reading made from the recording produced by the gauge while in the hole. Others have provided gauges for transmitting signals by way of a conductive cable to the earth's surface where the signals are utilized for ascertaining the pressure in the bottom of the bore hole.

The present invention is directed towards improvements in the latter type of pressure gauges and provides a gauge for lowering into a bore hole which penetrates a subterranean formation, the gauge being lowered by a conductive cable. The gauge functions to generate an A.C. signal, the frequency of which is indicative of the detected pressure of the subterranean formation.

One of the difficulties experienced with known pressure gauges of the kind which provide an A.C. signal readout transmitted to the earth's surface is that of maintaining accuracy of calibration as temperature changes.

Another difficulty experienced with known pressure gauges is that of maintaining accuracy of calibration. Down hole gauges must be lowered for a great distance, usually several thousand feet through a cased or uncased bore hole, to the bottom of a well. This must, for purposes of economy, be done as rapidly as possible. The gauges are therefore subjected to very rough treatment and yet they must be able to detect and remotely read out pressure to a high degree of accuracy. It is an object of this invention to provide a remote indicating pressure gauge which is constructed in such a way as to provide accurate pressure indication in spite of the rough handling and treatment to which such gauges are subjected.

Another object of this invention is to provide a remote reading pressure gauge, including improved means of detecting very small changes in pressure.

Another object of the present invention is to provide a bottom hole pressure gauge, including improved means of maintaining the accuracy of the gauge, particularly with respect to providing means of temperature compensation.

An additional object of this invention is to provide a remote reading bottom hole pressure gauge utilizing a capacitive type pressure detector including improved means for constructing the gauge for affording greater stability.

These general objects as well as other and more specific objects of the invention will be fulfilled in the following description and claims, taken in conjunction with the attached drawings.

DESCRIPTION OF THE VIEWS

DETAILED DESCRIPTION

Figure 1:
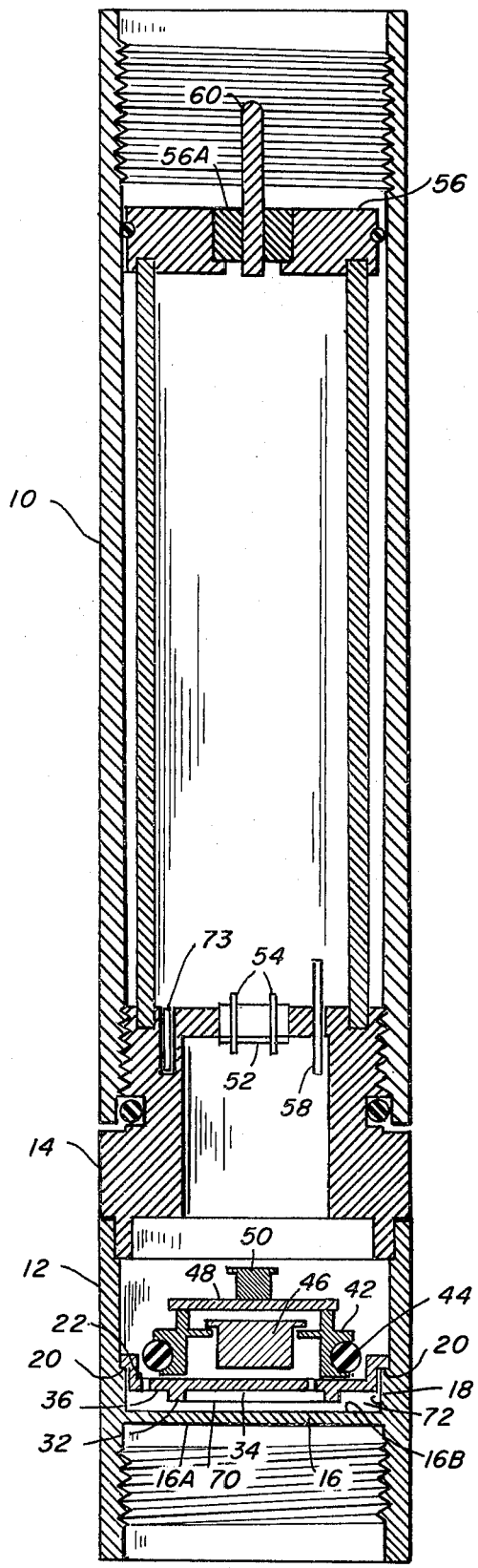
FIG. 1 is a cross-sectional view of a bottom hole pressure gauge embodying the principles of the invention.

Referring to the drawings and first to FIG. 1, the portion of the gauge which is lowered into a subterranean formation through a bore hole is shown. This may be termed the "down hole" portion. The gauge includes a tubular housing 10 including a lower portion 12. Coupling the upper portion 10 and lower portion 12 is an isolation plug 14.

The housing lower portion 12 includes a diaphragm portion 16 which includes the lower end of the housing, the external surface 16A of the diaphragm being exposed to the ambient pressure in which the gauge is positioned.

Formed in the interior of the housing lower portion 12 is a reduced diameter portion 18 which provides a ledge 20 on the interior surface of the tubular body portion 12.

Figure 2:
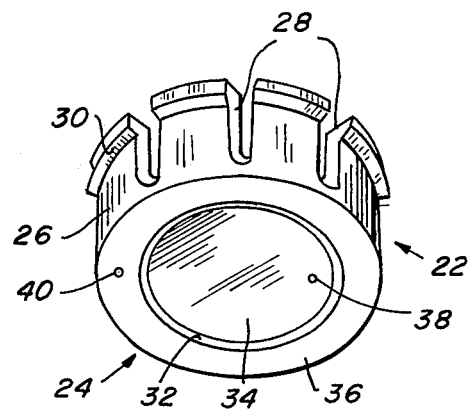
FIG. 2 is an isometric view of one embodiment of the stator element employed in the invention.

Positioned within the lower tubular body portion 12 is a cup shaped stator element 22, best shown in FIG. 2. The stator element has a lower surface generally indicated by the numeral 24 which, when positioned in the tubular body 12, is parallel to the interior surface 16B of the diaphragm. The side walls 26 of the stator element are of external diameter less than the internal diameter of the body reduced diameter portion 18. In the preferred arrangement, the side walls have notches 28 therein, which permit the stator element to flex to compensate for differences in the coefficient of expansion of the stator element 22 and tubular lower body portion 12.

Formed on the upper open end of the stator element 22 is an enlarged external diameter lip 30 which engages the ledge 20 in lower tubular body 12. The engagement of lip 30 with ledge 20 serves to accurately position the stator lower surface 24 relative to diaphragm 16.

The stator 22 is preferably formed of ceramic material. In the embodiment of the invention illustrated in FIGS. 1 and 2, the stator lower surface 24 includes an integral circular ridge 32 which divides the lower surface 24 into an inner circular capacitive surface 34 and an outer ring shaped capacitive surface 36. The surfaces 34 and 36 are formed of a conductive material and in a preferred arrangement are formed by coating the ceramic stator element 24 in these areas with a metallicized surface. As shown in FIG. 2 a small opening 38 is formed in the capacitive surface 34 to carry a connecting conductor and, in like manner, an opening 40 provides means of connecting with the capacitive surface 36. It can be seen that the capacitive surfaces 34 and 36 are closely spaced to diaphragm 16 and, being of conductive material, form a capacitive relationship with the diaphragm. As the gauge is subjected to pressure changes, the diaphragm is flexed, changing the capacitance between it and the capacitive surface of the stator element to provide a means of detecting and measuring the pressure.

The stator element is secured in position within the tubular body by means of a high temperature bonding agent, or, as an alternative, a threaded retaining ring (not shown) may be employed. Any means of retaining the stator in position in the tubular body would be within the scope of the invention.

Referring again to FIG. 1, positioned partially within the cup shaped stator portion 22 is a support spool 42 having thereon a toroid air core inductor 44. Within the support spool 42 a switching device 46 may be positioned, the purpose of which will be described subsequently. Enclosing the upper end of the support spool is a support disc 48 which provides a mounting for an oscillator transistor 50.

The upper end of the lower housing portion 12 is sealably closed by the isolation plug 14. In practice, the interior of the lower housing portion 12 is maintained at a vacuum so as to minimize contamination and thereby minimize nonrepeatability of temperature effects.

The upper tubular body portion 10 includes the electronic circuitry which will be described subsequently. A feedthrough insulating block 52 provides means for passing conductors from the interior of the lower housing portion 10 while maintaining the vacuum seal of the lower housing. An evaluating tube 58 sealably extends through the isolation plug 14 as a means of evacuating the interior of the lower housing portion 12.

The upper end of the upper tubular housing portion 10 is closed by a disc 56 to keep contaminants out of the interior of the housing. Insulation portion 56A of the disc supports an output signal connector 60 which receives the end of a wire line (not shown) by which the signals from the gauge may be transmitted to the earth's surface and by which power for operation of the electronic circuitry may be provided.

Figure 3:
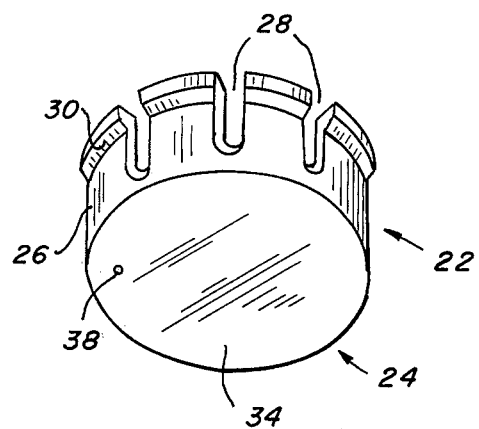
FIG. 3 is an isometric view as shown in FIG. 2 but showing a different embodiment of the stator element.

FIG. 3 shows an alternate arrangement of the stator element 22. In this embodiment the stator lower surface 24 does not include the ridge 22 of the embodiment of FIG. 2, but instead the entire lower surface 24 of the stator element is provided with a single conductive element to form the circular capacitive surface 34. In this embodiment only the single capacitive relationship between the stator and the diaphragm 16 is obtained. The difference in operation of the embodiments of FIGS. 2 and 3 will be described subsequently.

Figure 4:
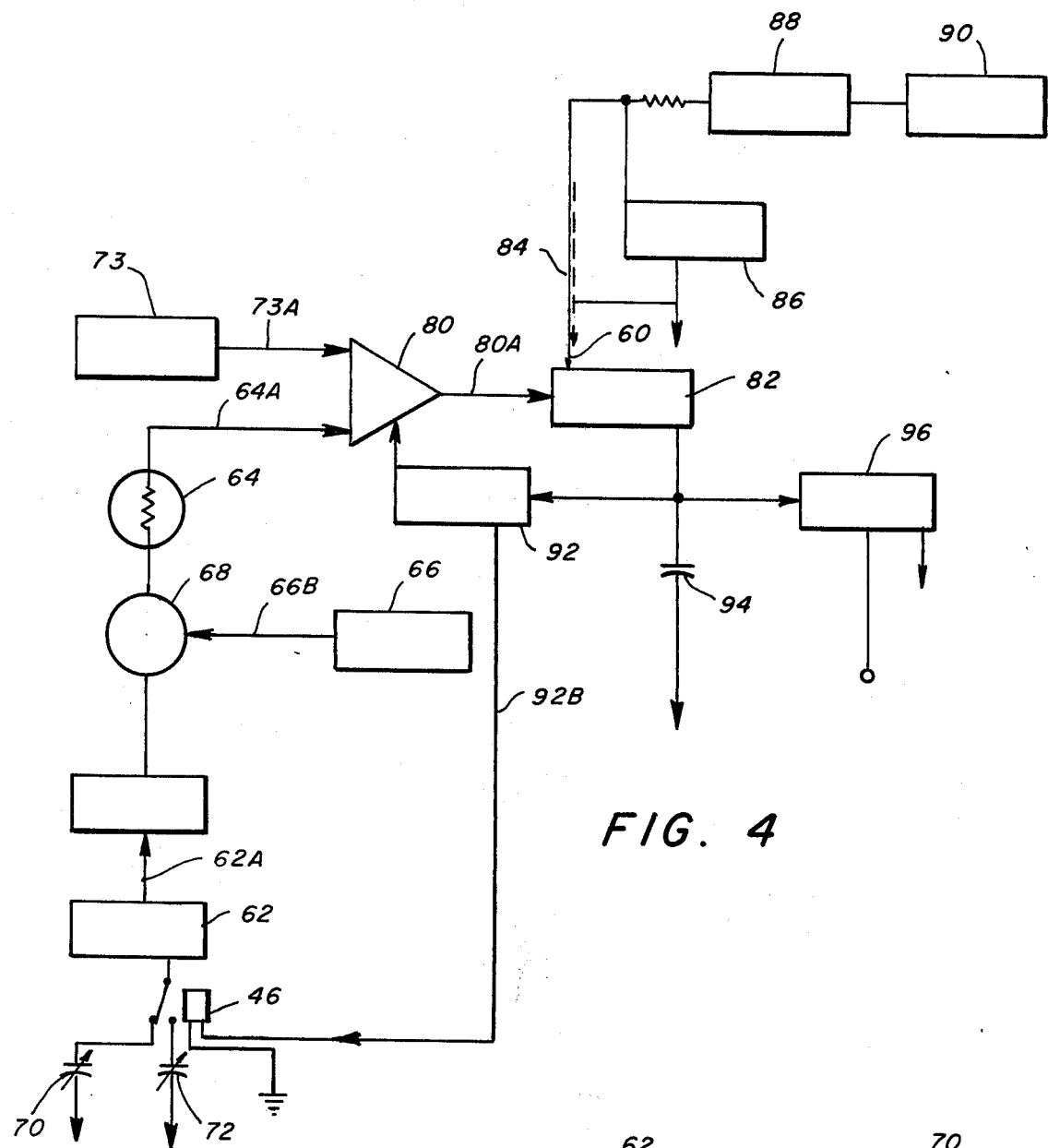
FIG. 4 is a block diagram of a circuit arrangement for utilizing the bottom hole pressure gauge of this invention.
Figure 5:
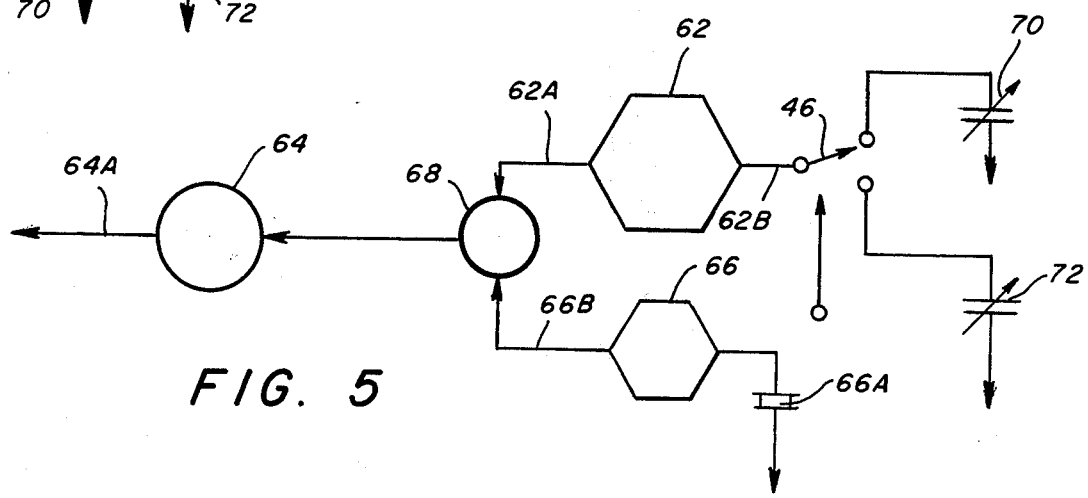
FIG. 5 is a block diagram showing an arrangement for obtaining a reading utilizing different portions of the stator element.

FIG. 5 shows a rudimentary diagram of the circuitry used with the structural arrangements shown in FIGS. 1, 2 and 3. The basic pressure responsive oscillator circuit is indicated by the numeral 62. This circuit includes the capacitor formed by diaphragm 16 and capacitive surface or surfaces of stator element 22 with inductor 44 and oscillator transistor 50, plus any other circuitry components required. Oscillator 62 may employ any of the known types of oscillator circuits practiced in industry. The output at 62A of oscillator circuit 62 may be fed directly to a signal processing circuitry indicated by FIG. 4 which is physically located in the upper tubular housing 10 and from there to signal connector 60 whereby the signl may be transmitted to the earth's surface. At the earth's surface the output of the oscillator 62 can thereby be used to indicate the pressure to which the diaphragm 16 is subjected. The preferred arrangement, however, as illustrated in FIG. 5, includes the use of a fixed frequency oscillator 66, controlled such as by crystal 66A, the output 66B being fed to a mixer circuit 68, with the output of the mixer circuit being fed to the signal processing circuitry 64.

For improved linearity of response, the oscillator circuit 62 is preferably arranged so that the full scale pressure change to which the instrument is designed to respond will cause oscillator 62 to vary in a range of about 10 to 20%. By combining the signal from oscillator 62 with the fixed frequency oscillator 67, thereby obtaining a signal representing the difference in frequency between the two oscillators, the output frequency is effectively expanded to a broader scale to more effectively utilize the signal transmitting band width characteristics of existing types of cables. An additional feature of the arrangement of FIG. 5 is the provision of switching device 46 (see FIG. 1 for the physical location thereof). The switching device 46 may be an electro-mechanical or solid state device. For purposes of simplicity of illustration, an electro-mechanical relay is illustrated, the center pole of which is connected to the input 62B of oscillator 62. Two poles of the switching device 46 are connected to capacitors 70 and 72. Capacitor 70 is formed by diaphragm 16 and the inner circular capacitive surface 34 on the stator element 24 while capacitor 72 is formed by diaphragm 16 and the outer ring capacitive surface 36 on the stator element. By actuation of the switching device 46, by means of which will be described subsequently, the signal transmitted by way of cable connector 60 to the earth's surface can be selected. The frequency generated when switching device 46 is in the illustrated mode, that is, where capacitor 70 is determinative of the output of oscillator 62, will be indicative of the pressure causing deformation of diaphragm 16. When the switching device 46 is actuated to the other position, a reference frequency output is obtained, since the deflection of the diaphragm 66 relative to the outer ring capacitive surface 36 is small, changes in the frequency output when capacitance 70 is in oscillator circuit 62, is an indication of changes which have occurred in other parameters of the gauge, particularly the effects of temperature. Thus, when capacitor 72 is utilized, a reference signal is generated which is useful in temperature correction of the gauge reading.

Referring to FIG. 4, an example is given of the more detailed circuitry arrangements which may be utilized to control the gauge to achieve the desired readings. First, going back to FIG. 1, a temperature sensor 73 is positioned in the tubular body 10 and, more particularly, in the illustrated arrangement in the isolation plug 14. Element 73 provides an output signal responsive to temperature, through circuitry which is well known in the industry although not specifically illustrated herein. Conductor 73A feeds the temperature signal to a signal selector circuit 80. Conductor 64A from the signal processing circuitry 64 is also fed to the signal selector 80. The output 80A of the signal selector is fed, by way of a line drive switch 82, to pin 60 which connects with a cable 84 carrying the down hole generated signal to the earth's surface. At the surface, a readout 86 is provided, including circuitry to receive the A.C. signals generated in the subsurface equipment. The readout equipment 86 preferably includes means to record and translate the frequency of the signal for indicating the down hole pressure, as well as for temperature correction. The particular arrangement of the surface readout equipment is not a part of this invention.

At the earth's surface is a D.C. power supply 88 which provides a D.C. energy necessary for operation of down hole equipment and a controller 90. The function of the controller 90 is to cause the power supply 88 to generate momentary positive or negative surges in the D.C. voltage which is applied by way of cable 84 to line drive switch 82. When a voltage surge is received, the same is treated in the line drive switch 82 and imparted to the latch control circuit 92 to provide a signal output at 92A to the signal selector 80 so that the signal output at 80A may be responsive to either the pressure, as provided by oscillator 62, or temperature, is provided by the temperature sensor 73. In addition, the latch control circuit 92 provides the signal at output 92B for actuation of switching device 46 so that with the proper signal generated from the surface controller 90 the output of oscillator 62 may be taken either from the pressure responsive capacitor 70 or the reference capacity 72 as previously described. The line driver switch 82 alternately connects conductor 84 to a power storage capacitor 94, and allows the line to float. The voltage from capacitor 94 is supplied to a voltage regulator circuit 96 from which the voltage is applied to the various down hole circuit components. This technique allowed the single insulated conductor line 84 to convey pulsating D.C. power to the gauge down hole equipment and simultaneously convey the desired A.C. signals to the surface readout equipment 86.

The circuit arrangement of FIG. 4 is given by way of example only to illustrate an embodiment wherein the pressure responsive signals generated by the gauge of this invention may be transmitted using a single conductor cable to the earth's surface. Obviously, many different circuit arrangements may be employed utilizing the down hole pressure gauge of this invention.

While the invention has been described with a certain degree of particularity it is manifest that many changes may be made in the details of construction and the arrangement of components without departing from the spirit and scope of this disclosure. The invention is not limited to the embodiments set forth herein for purposes of exemplification, but is to be limited only by the scope of the attached claim or claims, including the full range of equivalency to which each element thereof is entitled.

What is claimed:

1. A gauge for remotely indicating pressure, comprising:
    a tubular housing having a closed end forming an integral diaphragm, the exterior surface of which is subjected to the pressure to be measured in the housing having a reduced internal diameter portion adjacent said diaphragm forming an integral circumferential ledge;
    a cup shaped stator element of insulating material, the stator element having a closed bottom and opened top, the external diameter of the stator element being slightly less than the internal diameter of said housing reduced diameter portion, and having an enlarged external diameter lip portion at the top, the external diameter of the lip portion being larger than the internal diameter of said housing reduced diameter portion and slightly less than the internal diameter of said housing whereby the lip portion rests on said housing ledge to accurately position the stator element closed bottom adjacent to and spaced from the internal surface of said diaphragm forming the closed end of said housing, at least a portion of the external surface of the closed bottom portion of the stator element having a conductive surface thereon forming a capacitive relationship with said housing diaphragm portion;
    a conductive cable connected to the housing by which electrical signals may be carried to a remote location; and
    circuit means connected with the capacitor formed by said diaphragm and stator elements providing an A.C. signal responsive to the spacing between the diaphragm and stator element, the output of the circuit means being connected to said conductive cable.

2. A gauge according to claim 1 wherein said stator element is formed of ceramic material and wherein said capacitive surface if formed by a layer of metallic material secured to the stator surface.

3. A gauge according to claim 1 wherein said stator element has a plurality of slots therein extending from said lip portion to adjacent said closed bottom.

4. A gauge according to claim 1 wherein said external surface of said stator closed bottom has thereon a first conductive surface forming a first capacitive surface and a second, conductive surface forming a second capacitive surface, said capacitive surfaces being insulated from each other and
    switch means selectably connected to first and second capacitive surfaces, with said circuit means for independently generating A.C. signals.

5. A gauge according to claim 4 wherein said first capacitive surface is formed on said stator element external bottom surface in the form of a circle concentric with the axis of said bottom surface and wherein said second capacitive surface is in the form of a ring of conductive material coaxial with said circular first surface, the internal diameter of said second surface being larger than the external diameter of said circular first surface.

6. A gauge according to claim 1 comprising:
    a circular support spool coaxially supported with said stator element and at least partially within said stator opened top cup portion; and
    an inductive element supported on said support spool having connection with said circuit means, said inductive element and said capacitive element formed by said diaphragm end portion of said housing and said conductive portion of said stator bottom as the L.C. portion of an oscillator, the output frequency being indicative of the capacitive variation due to the pressure deflection of said diaphragm.

7. A gauge according to claim 6 wherein said inductive element is in the form of a toroid.

8. A gauge according to claim 1 including:
    a temperature detecting element supported within said housing providing a temperature signal output indicative of the detecting temperature; and
    a switch means for selectably transmitting the output of said pressure indicating circuit means and said temperature signal to a remote location.

* * * * *